April 7, 1970   J. V. M. BE BONA   3,504,815
TANDEM WHEEL STEERING MECHANISM FOR A LIFT VEHICLE
Filed Aug. 14, 1967   2 Sheets-Sheet 2
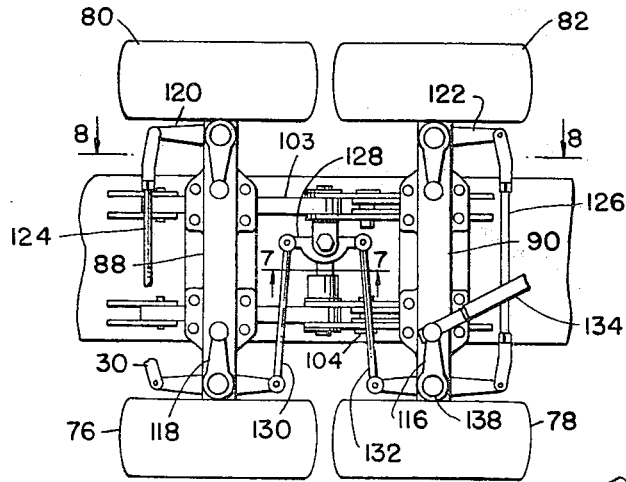
FIG.5
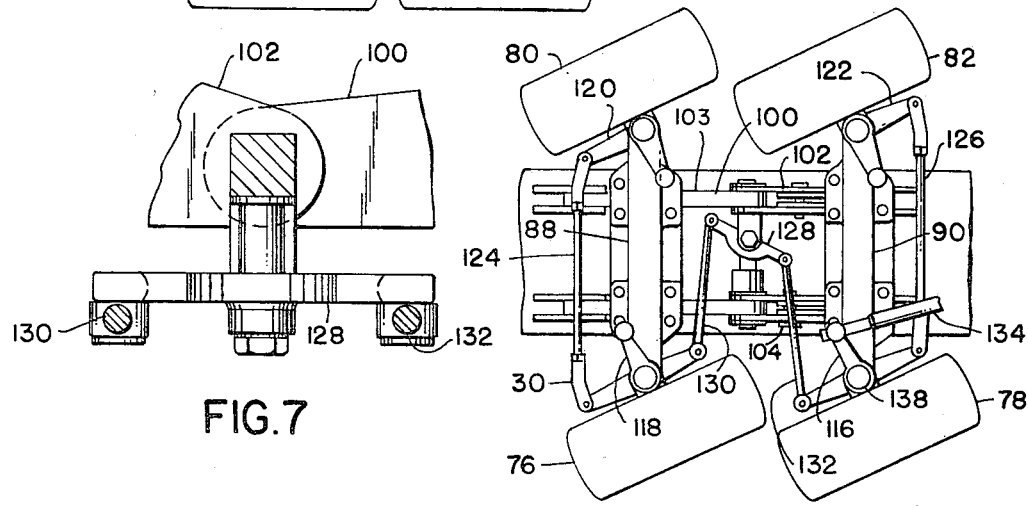
FIG.7
FIG.6
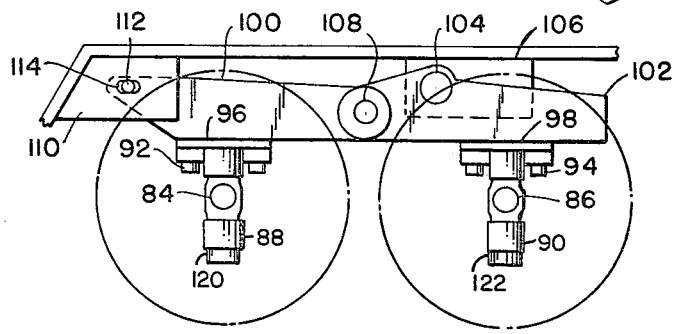
FIG.8
INVENTOR
JOHN V.M. DeBONA
BY Whittemore, Hulbert & Belknap
ATTORNEYS United States Patent Office 3,504,815
Patented Apr. 7, 1970

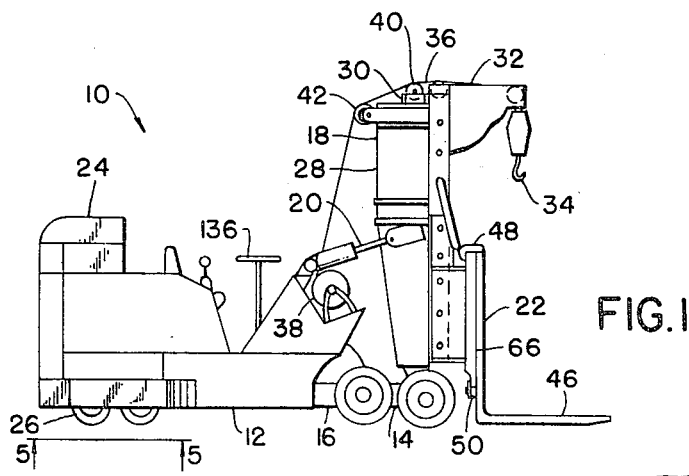
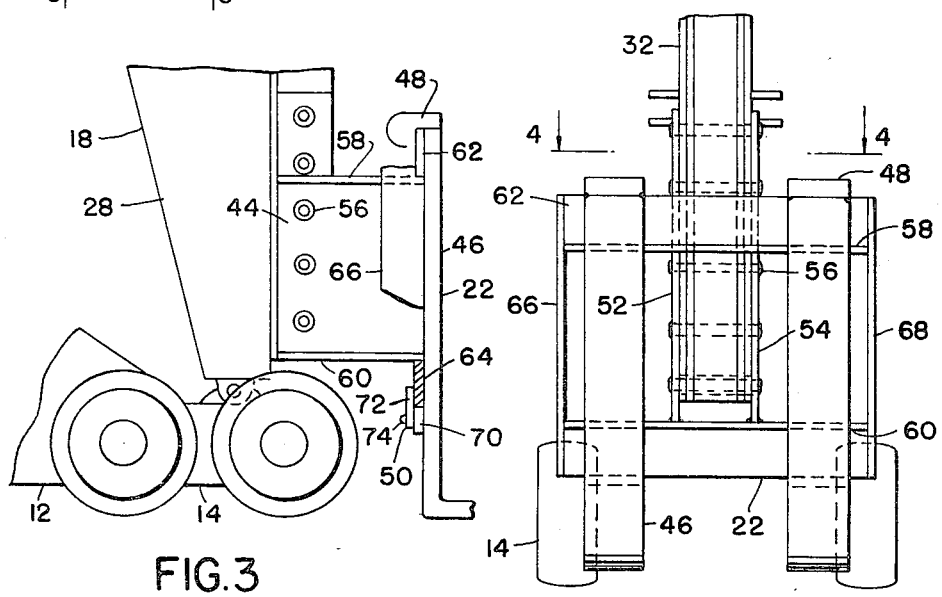
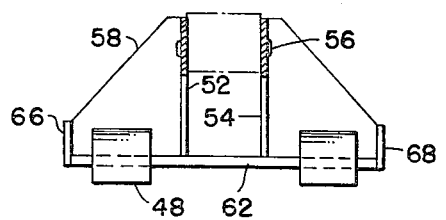

3,504,815
TANDEM WHEEL STEERING MECHANISM FOR A LIFT VEHICLE
John V. M. De Bona, Orchard Lake, Mich., assignor to Darin & Armstrong, Inc., Detroit, Mich., a corporation of Michigan
Continuation-in-part of application Ser. No. 522,629, Jan. 24, 1966. This application Aug. 14, 1967, Ser. No. 660,251
Int. Cl. B65g *47/00;* B62d *1/10;* B60b *1/54*
U.S. Cl. 214—672                                 3 Claims

ABSTRACT OF THE DISCLOSURE

A mobile crane comprising a truck, a crane chassis pivotally connected to the truck at one end thereof, a crane pivotally connected to and extending upwardly from the chassis, and an extensible link pivoted at opposite ends to the truck and crane, a fork removably secured to the crane and a weight positioned on the other end of the truck, tandem wheels at the end of the truck and means for suspending the tandem wheels for vertical movement and arcuate movement toward each other and for providing positive steering for each of the dual wheels during movement thereof.

CROSS REFERENCE TO RELATED APPLICATION

This application is a continuation-in-part of application Ser. No. 522,629, filed Jan. 24, 1966 now Patent No. 3,344,931.

BACKGROUND OF THE INVENTION

Field of the invention

The invention relates to mobile crane structures and refers more specifically to a mobile crane structure including a pivoted extendible crane on a crane chassis, Description of prior art In the past wherein mobile cranes have been provided, the crane structures have not included an extendible crane pivotally connected to a crane chassis pivotally connected to one end of a truck. Forks in combination with crane structure have similarly been lacking in the prior art. Thus, the prior art has provided only the usual forklift trucks and construction cranes which are expensive and have limited versatility.

Further, fork-lift trucks of the past have generally had single rear wheels which are unsuited for carrying heavy counterweights placed thereover to increase the load handling capability of the trucks. Where tandem rear wheels have been provided in the past, on structures, such as fork-lift trucks and the like, they have not been suspended for vertical movement or connected for positive steering from a single steering column. Such structure is desirable since it maintains traction and steering efficiency.

SUMMARY OF THE INVENTION

In accordance with the invention, a mobile crane including a truck, a crane chassis pivotally connected to one end of the truck and a crane pivotally connected to the crane chassis is provided with fork structure which is removable therefrom. In addition, in accordance with the invention, tandem wheels are provided at the other a removable fork and tandem rear wheels having separate vertical suspension and positive steering.
end of the truck to support added weight thereon, permitting greater loads to be carried by the crane structure and fork which dual wheels are separately suspended for vertical movement and are steered by common steering structure.

BRIEF DESCRIPTION OF THE DRAWINGS

FIGURE 1 is a side elevation view of mobile crane structure constructed in accordance with the invention.

FIGURE 2 is an enlarged front elevation view of a portion of the mobile crane structure illustrated in FIGURE 1, particularly showing the removable fork structure.

FIGURE 3 is a side elevation view of the fork structure illustrated in FIGURE 2 with the fork partly broken away.

FIGURE 4 is a top view of the fork structure illustrated in FIGURES 2 and 3, taken substantially on the line 4—4 in FIGURE 2.

FIGURE 5 is an enlarged bottom view of the suspension and steering structure for the tandem rear wheels of the mobile crane structure illustrated in FIGURE 1.

FIGURE 6 is a second view of the suspension and steering structure of the tandem rear wheels of the mobile crane structure illustrated in FIGURE 1, similar to that of FIGURE 5 but with the wheels turned.

FIGURE 7 is an enlarged partial cross section of the suspension and steering structure illustrated in FIGURE 5 taken substantially on the line 7—7 in FIGURE 5.

FIGURE 8 is a section view of the suspension and steering structure illustrated in FIGURE 5 taken substantially on the line 8—8 in FIGURE 5.

DESCRIPTION OF THE PREFFERED EMBODIMENT

The mobile crane structure 10, illustrated in FIGURE 1, includes the truck 12, a crane chassis 14 pivotally connected to truck 12 at the end 16 thereof, the crane 18 extending vertically from and pivoted to the chassis 14 and the extensible links 20 pivotally mounted at opposite ends to the crane structure 18 and truck 12. The mobile crane 10 further includes the fork structure 22 and counterweight 24, illustrated best in FIGURES 1 through 4, and the dual rear wheels 26 having novel suspension structure 28 and steering structure 30, illustrated best in FIGURES 5 through 8.

The crane structure 18 which is more completely disclosed in the parent application referenced above includes a support 28 which telescopically houses a mast 30 for reciprocation vertically by means of a power cylinder (not shown) secured to support 28. Boom 32 is pivotally conected to the mast 30 at the bottom thereof for pivotal movement with respect thereto to position the hook 34 for lifting weights when desired. As shown, the cable 36 is secured to winch 38 at one end and extends over pulleys 40 and 42 to connect to hook 34.

The removable fork structure 22 includes the fork supporting structure 44, the forks 46, fork securing structues 48 and fork locking structures 50.

The fork supporting structure 44 includes a pair of connecting plates 52 and 54 positioned to extend on opposite sides of the crane structure 18 and to be secured thereto by the pins 56 extending through the plates 52 and 54 and through the mast 30 of the crane structure 18.

Upper and lower plates 58 and 60 are connected to the connecting plates 52 and 54 as shown best in FIGURE 3, which plates have the configuration illustrated best in FIGURE 4. A top fork securing member 62 and a bottom fork locking member 64 are secured to the upper and lower plates 58 and 60, respectively, by convenient means, such as welding or the like, as shown best in FIGURE 3. Side braces 66 and 68 are then welded to the upper and lower plates 58 and 60 and top and bottom members 62 and 64, as shown, to impart rigidity to the fork supporting structure 44.

The fork securing structures or hooks 48 are then welded to the forks 46, as shown. With the fork supporting structure 44 secured to the mast 30 by pins 56, the forks may be secured to the fork supporting structure by placing the hooks 48 over the upper fork securing member 62, as shown best in FIGURE 3. The forks 46 may at this time be moved to any desired position along the fork securing member 62.

The fork locking structures 50 include a spacer plate 70 secured to the forks 46 and a locking bracket 72 secured to the spacer plate 70 by convenient means, such as bolt 74. The locking structures serves to lock the forks 22 to the fork supporting structure 44 in a desired position.

Thus, in operation, when it is desired to remove the fork structure 22 from the crane 18, it is only necessary to run the mast 30 down to the position wherein the forks 46 rest on solid material to relieve the sheering pressure on the pins 56 and to drive the pins 56 out. The fork structure 22 will then be removed from the crane 18, allowing operation of the crane 18 with boom 32.

As shown in FIGURE 5, the tandem wheels 76 and 78 and the tandem wheels 80 and 82 are mounted on axles 84 and 86, respectively. The axles 84 and 86 are rotatably secured in the transverse members 88 and 90, respectively. Transverse members 88 and 90 are in turn secured by means of bolts 92 and 94 to the plates 96 and 98 carried by the axle mounting members 100 and 102, respectively.

The axle mounting members 102 are provided in pairs at each side of the suspension structure 103 and are pivotally mounted centrally by pivot pin 104 to the fixed bracket 106 connected to the frame of the truck 12. The plates 98 are connected to one end of the axle mounting members 102, while one end of the axle mounting members 100 is pivotally connected by pivot structure 108 to the other end of the axle mounting members 102, as shown best in FIGURE 8.

The plate 96 is secured to the axle mounting 100 centrally thereof, while the other end of the axle mounting members 100 is pivotally secured to the bracket 110 which in turn is secured to the frame of the truck 12 by pivot pin 112. Pin 112 slides in a slot 114 in the other end of the axle mounting members 100 to provide a lost motion pivot connection therebetween.

It will be seen that on clockwise rotation of the axle mounting members 102 about the pivot pin 104, relative vertical and arcuate movement of the wheels 76 and 78, and 80 and 82 will occur. The wheels 76, 78, 80 and 82 may thus be maintained in contact with uneven ground to provide constant support for the truck 12 carrying the counterweight 24.

Such relative movement of the axles 84 and 86 of the tandem wheels 76, 78, 80 and 82 would not permit steering of both sets of wheels from a single steering member with previous steering structures. However, with the steering structure 30 of the invention, both sets of tandem wheels may be steered together, as illustrated in FIGURE 5, providing more efficient steering of the mobile crane structure 10.

The steering structure 30 includes the double ended bell-crank levers 116 and 118, the single ended bell-crank levers 120 and 122, the rods 124 and 126 therebetween, the centrally pivotally mounted connecting link 128, and the rods 130 and 132 between the opposite ends of the connecting link 128 and one end of the bell-crank levers 118 and 116, respectively. The pivotal connections of the rods 130 and 132 to the link 128 and the double ended bell-crank levers 116 and 118 provide for vertical, as well as angular movement, between the bell-crank levers 116 and 118 and the connecting link 128. The connecting link 128 is carried by the pivot structure 108 between the axle supporting members 102 and 100, as shown best in FIGURES 6 and 7.

Thus, as the wheels 76 and 78, and 80 and 82 move vertically and therefore come closer together or move farther apart, the link 128 moves a sufficient distance vertically to prevent binding of the steering structure 30 which is driven through the single steering column 34. Steering column 134 is operable on turning of the steering wheel 136 to pivot the bell-crank lever 116 about the pivot mounting 138 to move the bell-cranks rods and link, as shown in FIGURE 6.

It will now be evident that simultaneous positive steering of the tandem wheels 76 and 78, and 80 and 82 is possible with the disclosed structure in a simple, economical and efficient manner, even with the wheels 76, 78, 80 and 82 suspended for relative arcuate movement toward and away from each other, as well as for vertical movement.

What I claim as my invention is:

1. In a mobile crane structure including a truck with a frame, means at one end of the truck for lifting substantial weight and tandem wheels at the other end of the truck, means for suspending the wheels to permit arcuate movement in a vertical plane toward and away from each other to provide surface contact over uneven surface comprising a first wheel axle, a first axle supporting member connected to the first wheel axle at one end of the axle supporting member, pivot means secured to the truck frame pivotally connected to the first axle supporting member centrally of the first axle supporting member between the ends thereof, a second wheel axle, a second axle supporting member connected to the second wheel axle centrally of the second axle supporting member, lost motion pivot structure pivotally connecting one end of the second axle supporting member to the truck frame for both pivotal and sliding movement between the one end of the second axle supporting member and the truck frame and pivot means pivotally connecting the other end of the first and second axle supporting members together, and means connected to the means for suspending the wheels for maintaining positive steering of all the wheels during movement thereof.

2. Structure as set forth in claim 1, wherein the means for maintaining positive steering of all the wheels during movement thereof includes a steering column, a bell crank lever connected at one end to one set of wheels and to the steering column at the other end thereof, a second bell crank lever connected at one end to the other set of wheels, a centrally pivotally mounted connecting link and means connecting the opposite ends of the connecting link and the other ends of the bell crank levers.

3. Structure as set forth in claim 2, and further including a vertically extending pin on which the connecting link is centrally pivotally mounted and means for moving the vertically extending pin vertically with pivotal movement of the axle mounting members.

References Cited

UNITED STATES PATENTS

| 1,952,730 | 3/1934 | Remde | 214—671 |
| 2,704,615 | 3/1955 | Stokes et al. | 214—513 |
| 2,710,198 | 6/1955 | Hall | 280—81.5 |
| 2,818,275 | 12/1957 | Hallowell | 280—81.5 |
| 3,374,909 | 3/1968 | Ferwerda | 214—671 |

FOREIGN PATENTS

| 9,464 | 4/1907 | Great Britain. |
| 859,289 | 1/1961 | Great Britain. |

GERALD M. FORLENZA, Primary Examiner

R. B. JOHNSON, Assistant Examiner

U.S. Cl. X.R.

280—81.5, 91, 104.5